US006616283B1

(12) United States Patent  
Takano et al.

(10) Patent No.: US 6,616,283 B1  
(45) Date of Patent: Sep. 9, 2003

(54) PROJECTOR

(75) Inventors: Hirokuni Takano, Yoshikawa (JP); Takaya Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/666,738

(22) Filed: Sep. 20, 2000

(30) Foreign Application Priority Data

Sep. 22, 1999 (JP) .............................. 11-268106

(51) Int. Cl.[7] ...................... G03B 21/22; G03B 21/28; G03B 21/14; G03B 21/56
(52) U.S. Cl. ...................... 353/74; 353/76; 353/77; 353/79; 353/101; 359/449; 359/460
(58) Field of Search ........................... 353/74, 76, 77, 353/78, 79, 101; 359/449, 460; 348/840

(56) References Cited

U.S. PATENT DOCUMENTS

| 4,136,937 A | * | 1/1979 | Fettig | 353/27 R |
| 4,907,873 A | * | 3/1990 | Kuriyama | 353/101 |
| 6,181,386 B1 | * | 1/2001 | Knox | 348/788 |

\* cited by examiner

Primary Examiner—Russell Adams  
Assistant Examiner—Magda Cruz  
(74) Attorney, Agent, or Firm—Morgan & Finnegan, L.L.P.

(57) ABSTRACT

In a rear projector for projecting an image from behind a screen, its screen size is variable. In order to permit flexible adaptation to the variation in the screen size, the projector is constructed to permit easy adjustment of a detection device for detecting an image display position or a position indicated on the screen.

22 Claims, 16 Drawing Sheets

PROJECTOR

BACKGROUND OF THE INVENTION

1. Field of the Invention

The present invention relates to a rear projector for projecting an image from behind a screen and, more particularly, to a rear projector capable of adapting to different screen sizes.

2. Related Background Art

With image display apparatus (projectors), there are recent trends toward large screens. For example, the rear projection type image display apparatus is known as one of methods for realizing the large screens. The image display apparatus of this type is constructed to enlargingly project an image formed by an image forming device such as a liquid crystal panel or the like, through a projection lens (projection optical system) onto the backface of the screen (which is a surface on the far side from the user with respect to the screen) and to permit an observer to observe the transmitted image on the other side of the screen. In parallel with the trends toward the large screens of the image display apparatus, image control equipment has been developed for use in controlling an externally connected computer while entering coordinates by direct indication on the screen with an indicator or the like or for use in writing characters, graphics, etc., and has been being mounted on the image display apparatus.

The rear projection type image display apparatus heretofore was constructed to project the image onto the screen by use of a reflecting mirror in order to shorten the depth of the housing. The image display apparatus, as illustrated in FIG. 1 (also referring to FIG. 4), is set up to project an image from a projection optical system for forming the image and projecting it, onto the reflecting mirror 27 placed on a housing back panel 36 and thus project the image onto the thin screen 30 placed on the front surface of the housing, and the structure consists of two parts, the housing 37 having the projection optical system and the reflecting mirror 27, and the screen part 32 having the screen 30.

The image control equipment is an image control device comprised of an indicator for generating a light spot and a detection device for detecting the light spot generated by the indicator, and the detection device 26 is placed inside the housing 37. With these image display device and image control device, the image display position and the image control range for control of image were adjusted in such a manner that the image display position was adjusted relative to the screen part 32 upon installation of the projection optical system and that the position of the image control device was adjusted relative to the screen part 32 upon installation of the detection device.

In the housing structure consisting of the screen part 32 and the housing 37, as in the case of the above conventional image display device illustrated in FIG. 1, however, all the members of the housing 37 must naturally be changed with replacement of the screen part 32 for variation in the screen size.

The housings have been increasing their size with increase in the screen size of the image display apparatus and it is also becoming difficult to design the housings with sufficient accuracy in the relation of process accuracy with deflection of the members themselves and cost. This means that with increase in the screen size the displayed image becomes more affected by deviation between relative positions of the projection optical system and the reflecting mirror 27 placed on the back panel 36, because the increase in the screen size involves a trade-off relation between dimensional accuracy for each member and dimensional accuracy optically required. Part of the image cannot be displayed on the screen in certain cases. It is, however, extremely difficult in terms of the structure to adjust each of the image display position and the detection device 26 after the projection optical system and the detection device 26 have been incorporated in the housing.

SUMMARY OF THE INVENTION

An object of the present invention is, therefore, to solve the problem in the above conventional apparatus and provide a projector that is capable of flexibly adapting to change of the screen size and that permits easy adjustment of the image display position or the detection device forming the image control device.

A projector according to one aspect of the present invention is a projector of a rear projection type for projecting an image from behind a screen, which comprises:

a screen part having a screen of a predetermined size; and a main body part having projection means for projecting an image onto the screen, wherein said screen part is replaceable with a screen part having a screen of another size different from said screen of the predetermined size.

In the projector according to another aspect of the invention, a projection distance of said projector is variable.

In the projector according to another aspect of the invention, said screen part comprises a reflecting mirror behind said screen and said projection means projects the image via the reflecting mirror onto said screen to display the image thereon.

In the projector according to another aspect of the invention, said main body part comprises detection means for detecting information indicated on said screen.

In the projector according to another aspect of the invention, said information is a position indicated on said screen.

In the projector according to another aspect of the invention, said projection means and said detection means are integrally formed.

The projector according to another aspect of the invention comprises image control means for detecting the information indicated on said screen, by use of said detection means and changing the image displayed on said screen, based on the information.

In the projector according to another aspect of the invention, at least part of said projection means and said detection means is moved to effect positional adjustment of a range in which said projection means projects the image and a detection range in which said detection means can detect the information, on said screen.

In the projector according to another aspect of the invention, said main body part comprises a projection optical system for projecting the image and a detection optical system for detecting the information on the screen, and said projection optical system and said detection optical system are integrally formed in a state in which optical axes of said systems are parallel to each other.

A projector according to a further aspect of the present invention is a projector of a rear projection type for projecting an image from behind a screen, which comprises:

a screen part having a screen of a predetermined size; and a main body part comprising projection means for projecting an image onto the screen and detection means for detecting information on the screen, wherein said projection means and said detection means are integrally formed.

In the projector according to another aspect of the invention, said projection means and said detection means are integrally formed so that an optical axis of a projection optical system of said projection means is parallel to an optical axis of a detection optical system of said detection means.

The projector according to another aspect of the invention comprises image control means for changing the image displayed on the screen, based on the information detected by use of said detection means.

In the projector according to another aspect of the invention, a projection distance of said projector is variable.

In the projector according to another aspect of the invention, said screen part comprises a reflecting mirror behind said screen and the image is projected via the reflecting mirror onto said screen to be displayed thereon.

DETAILED DESCRIPTION OF THE PREFERRED EMBODIMENTS

Figure 1:
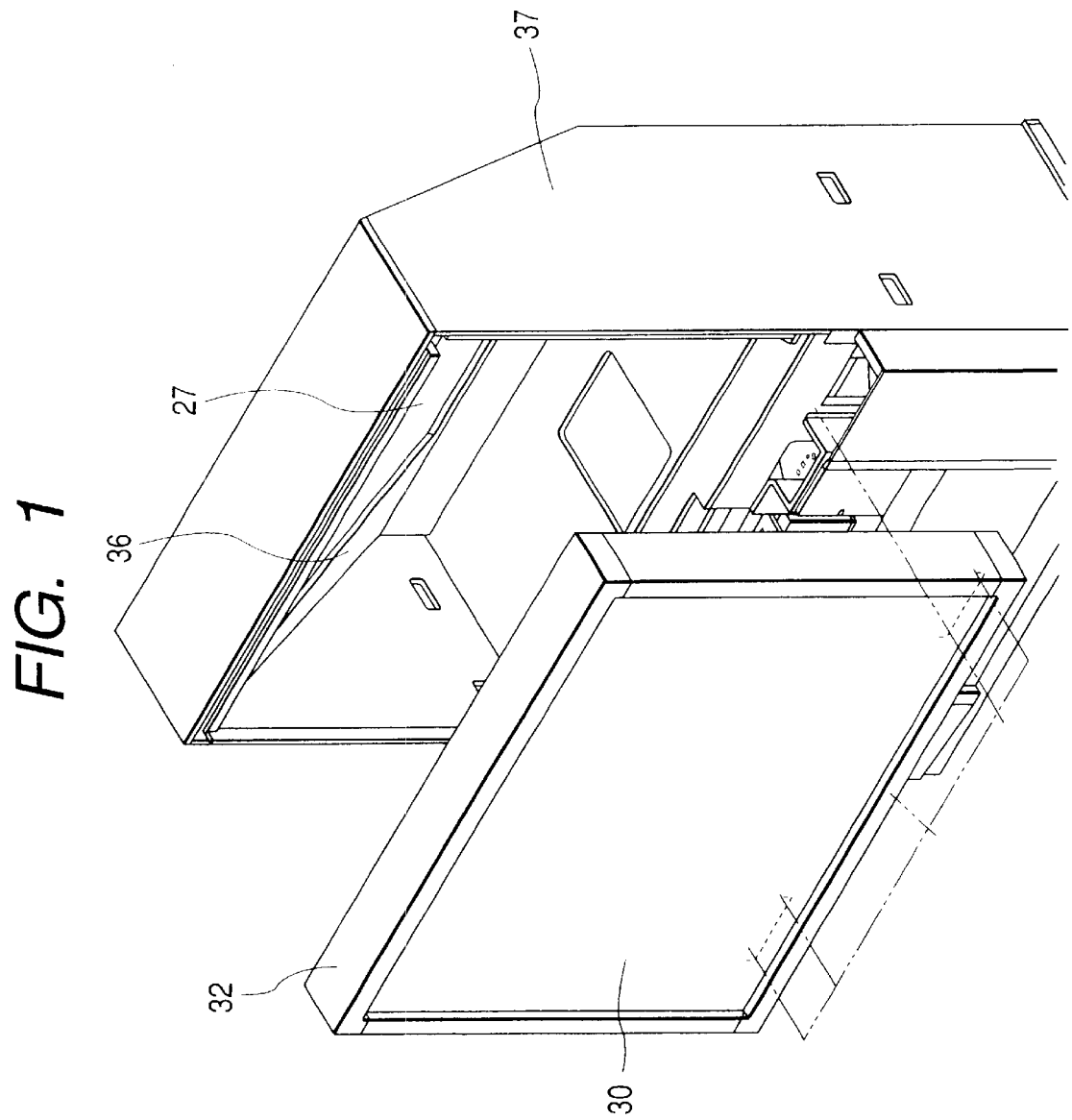
FIG. 1 is a drawing to show the structure of the conventional image display device.
Figure 2:
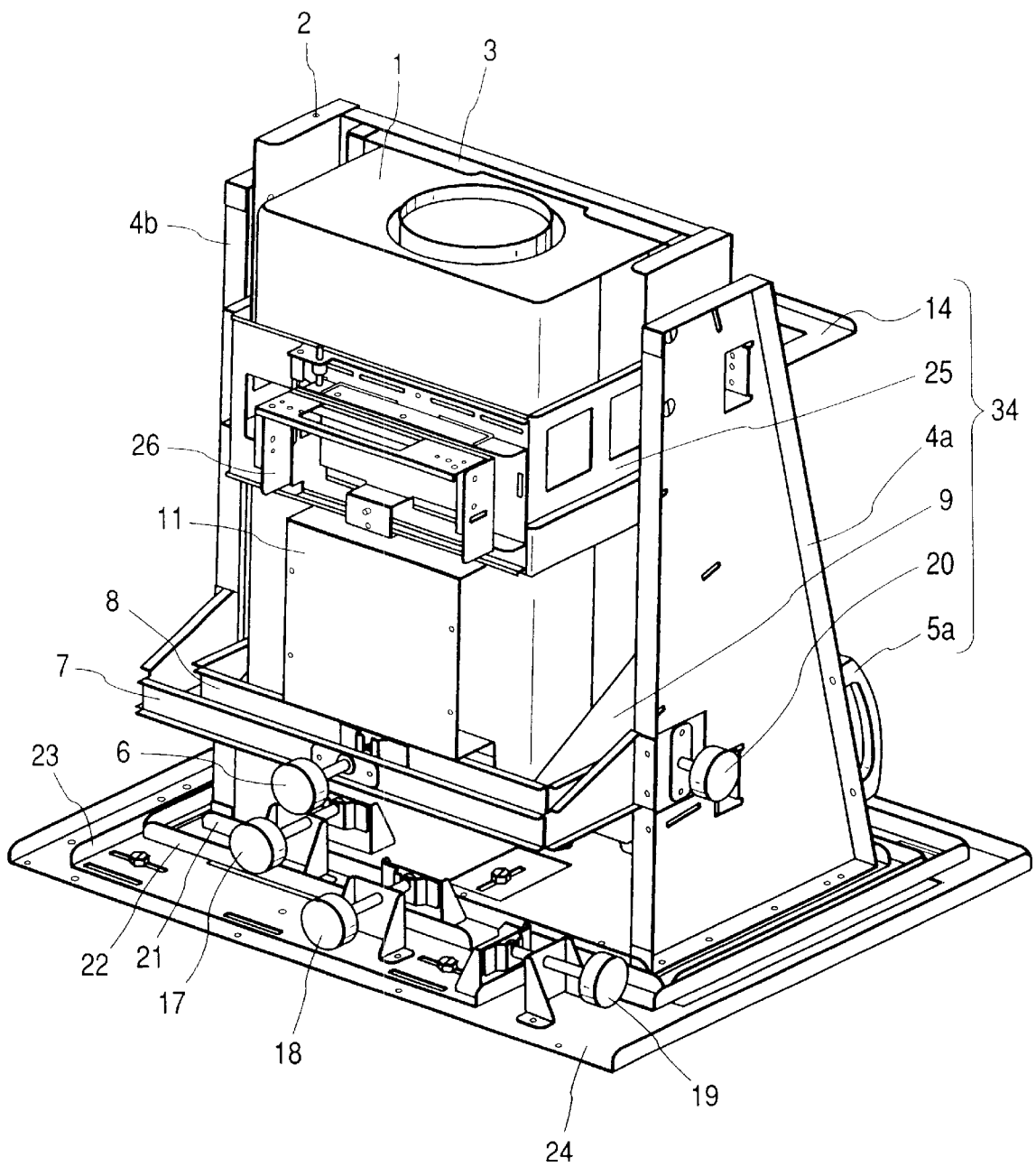
FIG. 2 is a drawing to show the overall structure of an adjustment unit in the projector according to an embodiment of the present invention.
Figure 3:
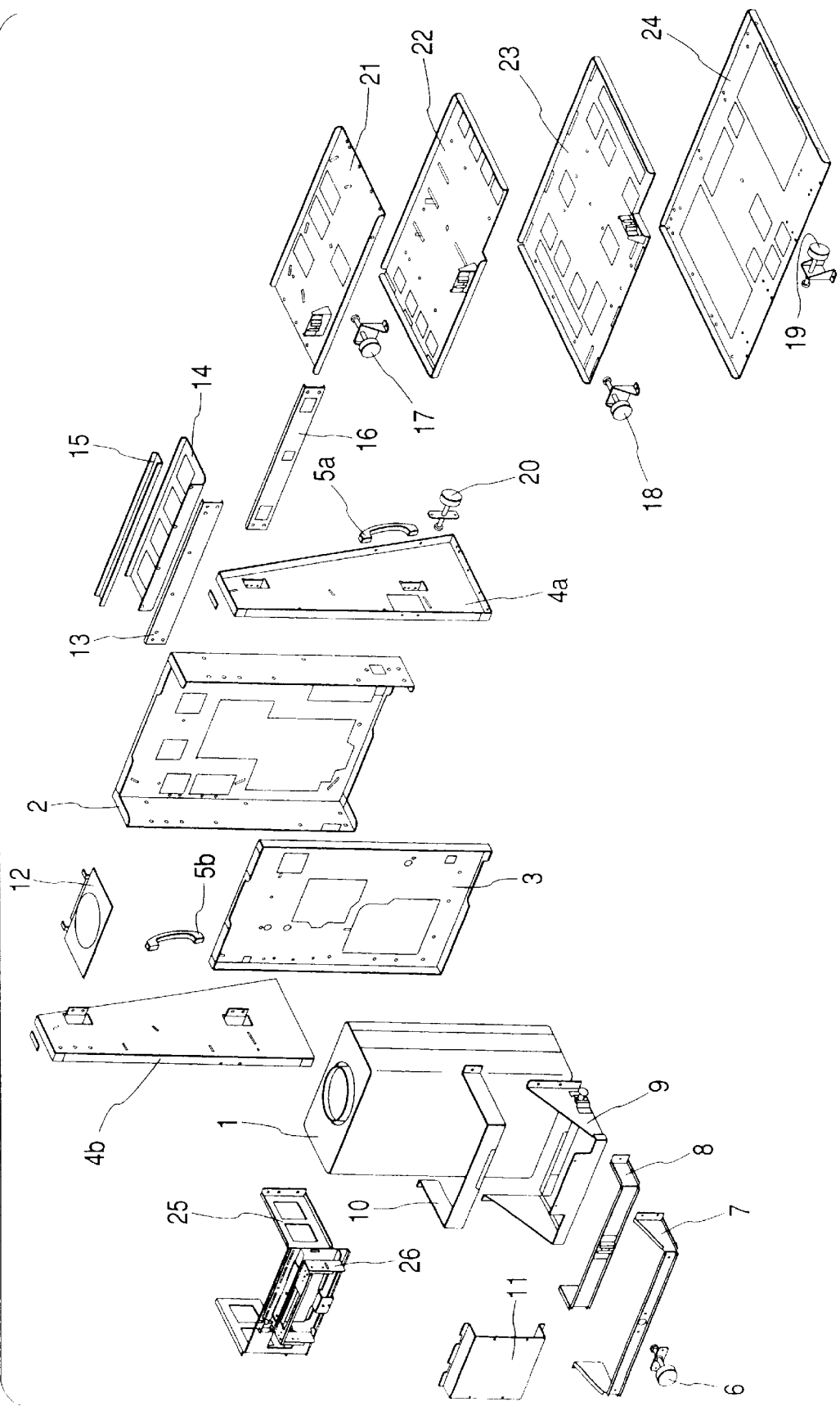
FIG. 3 is a drawing to show an exploded view of the adjustment unit of FIG. 2.

The projector disclosed in the present embodiment is constructed in such structure that the screen part having the screen of predetermined size can be separated from the main body part having the projection means for projecting the image formed by the image forming device onto the screen, whereby the screen size can readily be changed by simply replacing the screen part with another screen part on the main body part. An example of this structure employed for the housing structure will be described below referring to FIG. 4.

In the same figure, the housing structure of the rear projection type image display device provided with the back mirror is comprised of a lower part (main body part) 28, in which the projection means can be installed, and an upper part 33, in which the back mirror 27 is disposed and on which the screen 32 is mounted. The lower part and the upper part are separable from each other. In this structure, the projection means for projecting the image onto the screen and the detection device (detection means) 26 for detecting information indicated on the screen are set in an adjustment unit part 34, and the adjustment unit part 34 is mounted in the lower part 28.

The adjustment unit part 34 is constructed so that the projection means 1 can be adjusted relative to the lower part 28 in vertical and horizontal directions, rotational directions, tilt directions, etc. and so that the detection device 26 can be adjusted similarly relative to the projection means 1.

Since the housing structure of the rear projection type image display device provided with the back mirror can be separated into the upper part 33 and the lower part 28, the screen size can be changed by replacing the upper part 33 and the screen part 32 with another set.

Further, in the image display device described above, the projection means and the detection device 26 are first set and adjusted in the adjustment unit part 34 and the adjustment unit part 34 therewith is then mounted in the lower part 28, which can facilitate the adjustment after the projection means has been mounted inside the housing. When the range of adjustment is wide, it becomes feasible to obtain the structure rarely depending upon the mounting of the projection means, the accuracy of the housing, and an error in connection between the upper and lower parts of the housing.

In the image display device equipped with the image control device, the detection device inside the image control device has a detection optical system for detecting information on the screen and the projection means inside the main body part has the projection optical system for projecting the image onto the screen or the like. If the optical axis of the detection optical system and the optical axis of the projection optical system are parallel to each other and if the relative distance between them is always kept constant, the information can be detected irrespective of the size of the upper part 33. In the structure with the adjustment unit part 34, therefore, the projection means and the detection device 26 can be adjusted before the adjustment unit part 34 is mounted in the housing. Thus there is no need for adjustment of the detection device 26 after the adjustment unit part 34 has been set in the lower part 28.

Next, embodiments of the present invention will be described hereinafter, but, prior thereto, the detection device used in the embodiments will be first described briefly as an example of the detection device. It is a matter of course that the detection device is not limited to this example but can also be selected from a variety of other detection devices.

Figure 9:
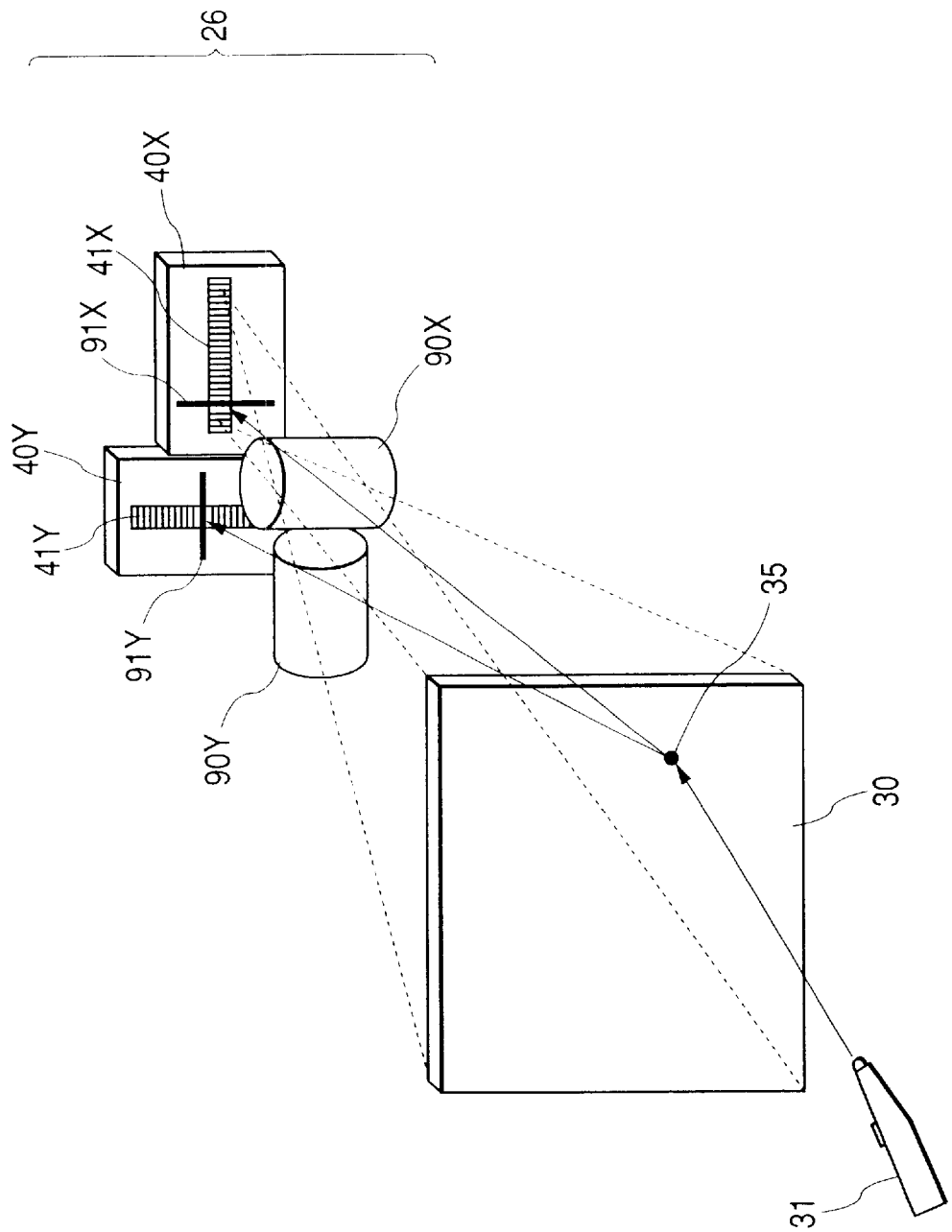
FIG. 9 is a drawing for explaining the function of the detection device.

FIG. 9 is an explanatory diagram to show the detection device used in the embodiments. The detection device is mainly comprised of an indicator 31 for forming a light spot on the screen 30 being an image control surface, and a detector for detecting, for example, coordinates of the position of the light spot 35 on the screen 30. The indicator 31 incorporates a light-emitting element such as a semiconductor laser or an LED for emitting a light beam, an emission control means for activating and controlling the emission, a plurality of control switch means, and a power supply means such as a battery or the like.

The emission control means performs control of on/off of emission according to states of the control switches and control of emission with a control signal superimposed by a modulation method.

The positional relation between two linear sensors 40X, 40Y is determined as illustrated in FIG. 9. Through a cylindrical lens 90X, 90Y as an imaging optical system, an image of the light spot 35 is focused in the form of a line 91X, 91Y on each sensor 41X, 41Y. These two sensors are placed at exactly right angles, whereby each sensor outputs a signal having a peak at a pixel reflecting an X-coordinate or a Y-coordinate. These two sensors are controlled by sensor control means and their output signals are converted into digital signals by A/D conversion means connected to the sensor control means. The digital signals are sent to a coordinate calculation means to calculate output coordinate values, and the result, together with data such as a control signal or the like from the control signal detection means, is sent through a communication control means to an external control device by a predetermined communication method.

In this example, the system concerning the detection, including the cylindrical lenses 90X, 90Y and the linear sensors 40X, 40Y, is defined as a detection optical system.

FIG. 2, FIG. 5, FIG. 9, and FIG. 10 show the structure of the embodiment of the present invention. In these figures, numeral 1 designates the projection means having the projection optical system for enlargingly projecting the image formed by the image forming device not illustrated, onto the screen, and the projection means, together with a projection-optical-system-fixing band (a plate for reinforcing fixing of the projection optical system) of 10, a projection-optical-system-supporting panel (a plate for reinforcing fixing of the projection optical system) of 9, and a detection-device-fixing panel of 25, is fixed to a projection-optical-system-fixing tilt panel A (a plate for fixing the projection optical system) of 3. The detection device 26 is fixed to the detection-device-fixing panel 25. A detection-device-substrate-fixing panel 11 is fixed to the projection-optical-system-supporting panel 9.

Figure 10:
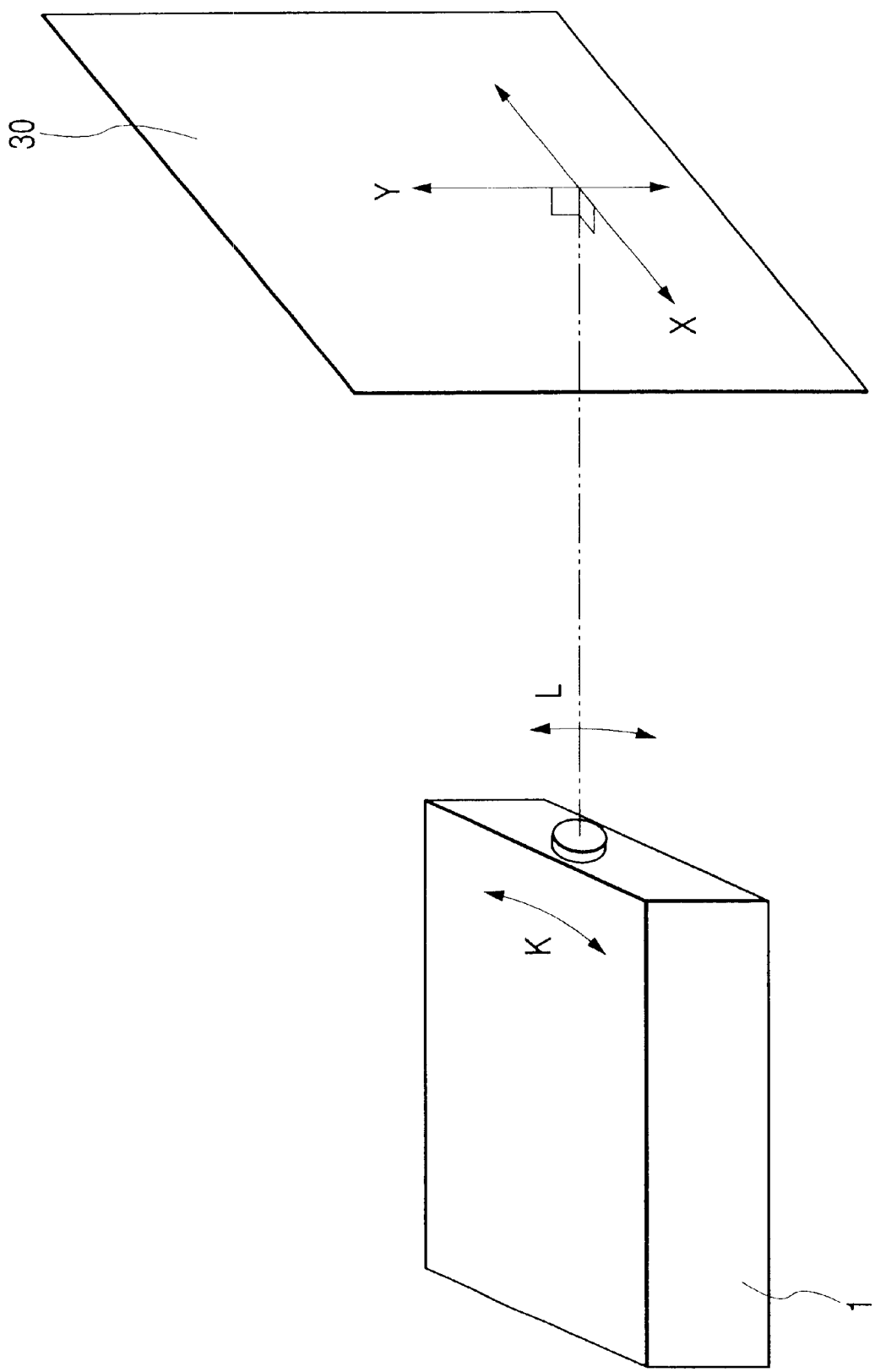
FIG. 10 is a drawing for explaining the adjustment of the position relative to the screen of the projection optical system, and other matter.

The above-stated unit consisting of the projection optical system, the projection-optical-system-fixing tilt panel A of 3, the projection-optical-system-supporting panel 9, the projection-optical-system-fixing band 10, the detection-device-substrate-fixing panel 11, the detection-device-fixing panel 25, and the detection device 26 is attached to a projection-optical-system-fixing tilt panel B of 2, and it can be adjusted with an adjustment knob A of 20 in directions K relative to the screen 30 as illustrated in FIG. 10. The unit is constructed to be adjusted so that the optical axis is incident at right angles in the X-directions to the screen 30, whereby X-directional trapezoidal distortion can be corrected.

A tilt assistance panel A of 8 is attached to the projection-optical-system-fixing tilt panel B of 2 and the projection-optical-system-fixing tilt panel B of 2 is attached to left and right side panels of symbols 4a, 4b. Therefore, the projection means can be adjusted with an adjustment knob B of 6 in directions L relative to the screen 30 as illustrated in FIG. 10 so that the optical axis is incident at right angles in the Y-directions to the screen 30, whereby Y-directional trapezoidal distortion can be corrected. A tilt assistance panel B of 7 is attached to the left and right side panels of 4a, 4b.

Next, the left and right side panels of 4a, 4b are fixed to a θ-adjustment panel of 21, and the θ-adjustment panel 21 is arranged to be rotatable relative to a Y-adjustment panel of 22, whereby rotational adjustment of θ can be effected relative to the screen 30 by adjusting an adjustment knob C of 17. The θ-adjustment panel 21 is attached to the Y-adjustment panel 22 and the Y-adjustment panel 22 is attached to an X-adjustment panel of 23. Since the Y-adjustment panel 22 is movable relative to the X-adjustment panel 23 in the Y-directions, the Y-directional position of the image field is corrected relative to the screen 30 by adjustment of an adjustment knob D of 18.

Next, the X-adjustment panel 23 is attached to an adjustment-unit-fixing panel of 24. Since the X-adjustment panel 23 is movable relative to the adjustment-unit-fixing panel 24 in the X-directions, the X-directional position of the image field is corrected relative to the screen 30 with an adjustment knob E of 19. Then the adjustment unit denoted by numeral 34 as a whole is positioned and fixed to the housing 28.

Figure 5:
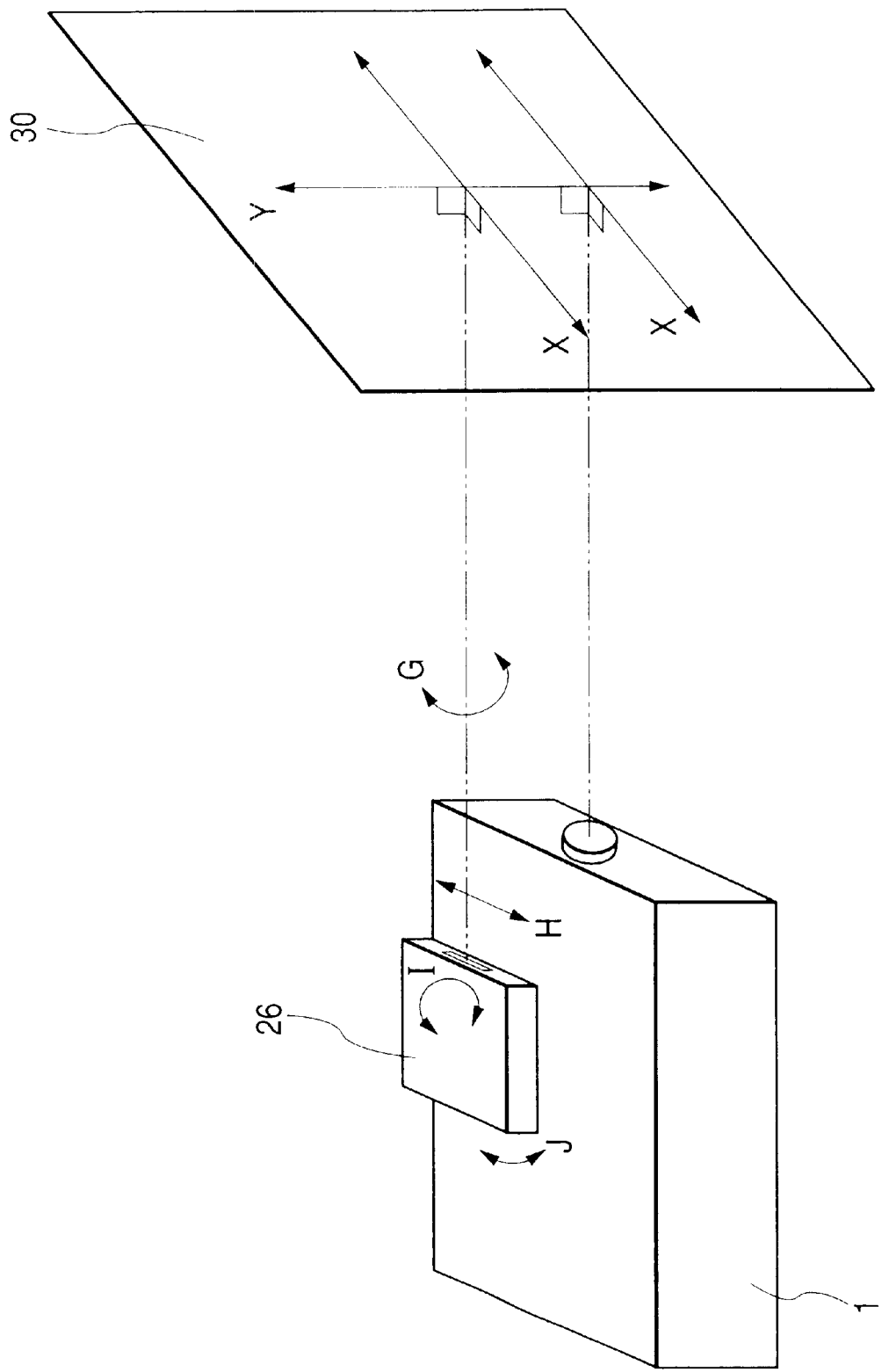
FIG. 5 is a diagram for explaining the adjustment structure by the detection device in the embodiment of the present invention.

Next, as illustrated in FIG. 5, the detection device 26 is attached to the detection-device-fixing panel 25 so that the adjustment in four ways of G, H, I, and J can be effected with respect to the projection optical system.

G indicates rotational adjustment for the optical axis of the detection optical system of the detection device, which permits alignment of relative position θ with the projection optical system.

H indicates capability of aligning the X-directional relative position of the detection optical system of the detection device 26 with the projection optical system.

I indicates capability of adjusting the optical axis of the detection optical system of the detection device 26 relative to the screen 30 to right angles in the X-directions.

Therefore, this permits the optical axes of the projection optical system and the detection optical system of the detection device 26 to be positioned relative to the screen 30 at right angles in the X-directions.

J indicates capability of adjusting the Y-directional position of the detection optical system of the detection device 26 relative to the projection optical system. Since the adjustment in the directions J permits the optical axis of the detection optical system to be positioned relative to the screen 30 at right angles in the Y-directions, the optical axes of the projection optical system and the detection optical system can be positioned relative to the screen 30 at right angles in the Y-directions.

Figure 4:
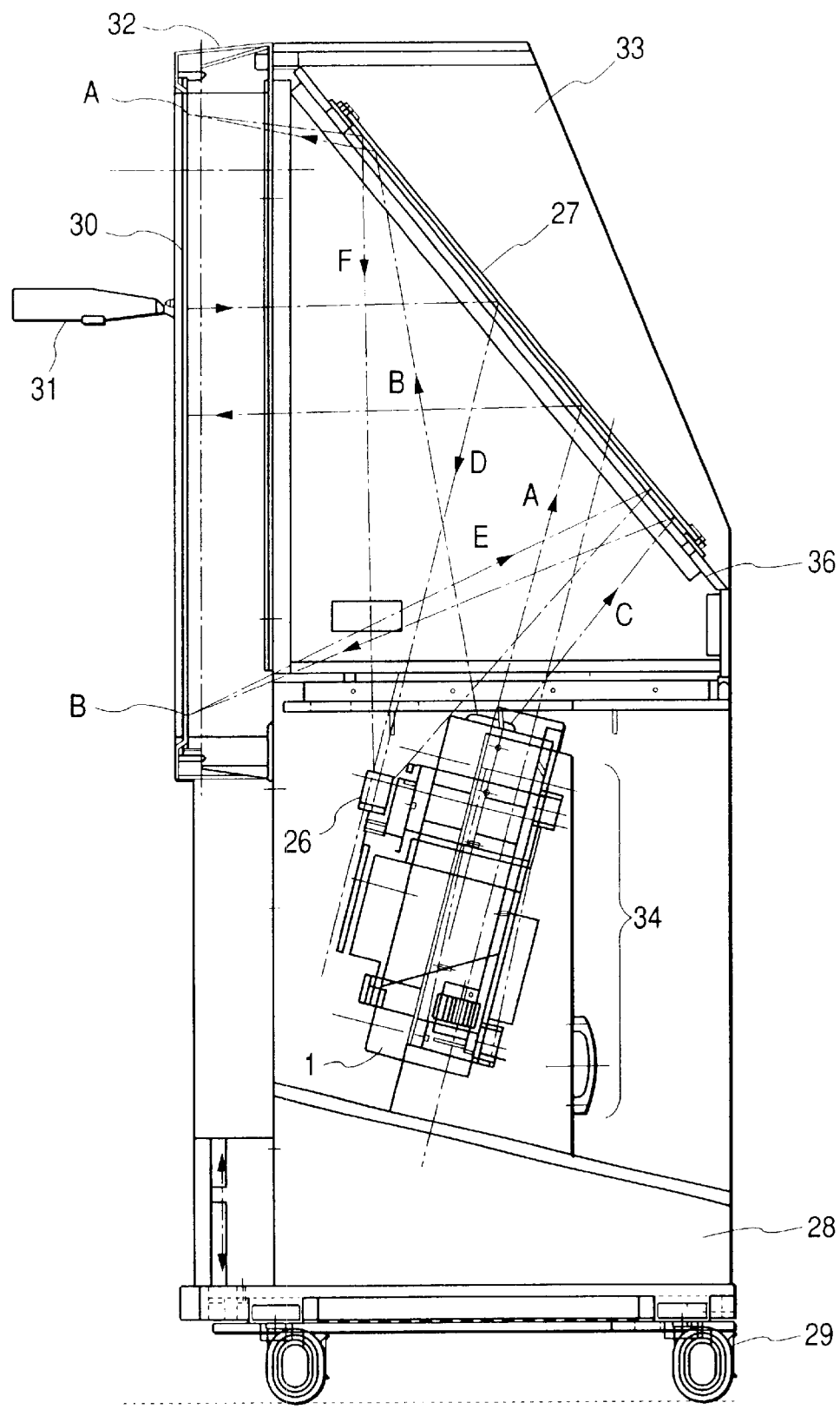
FIG. 4 is a drawing to show the overall structure of the projector in the embodiment of the present invention.

Through these adjustments, as illustrated in FIG. 4, the optical path F of the detection optical system can be matched at A with the optical path B of the projection optical system, and the optical path E of the detection optical system at B with the optical path C of the projection optical system.

Figure 6:
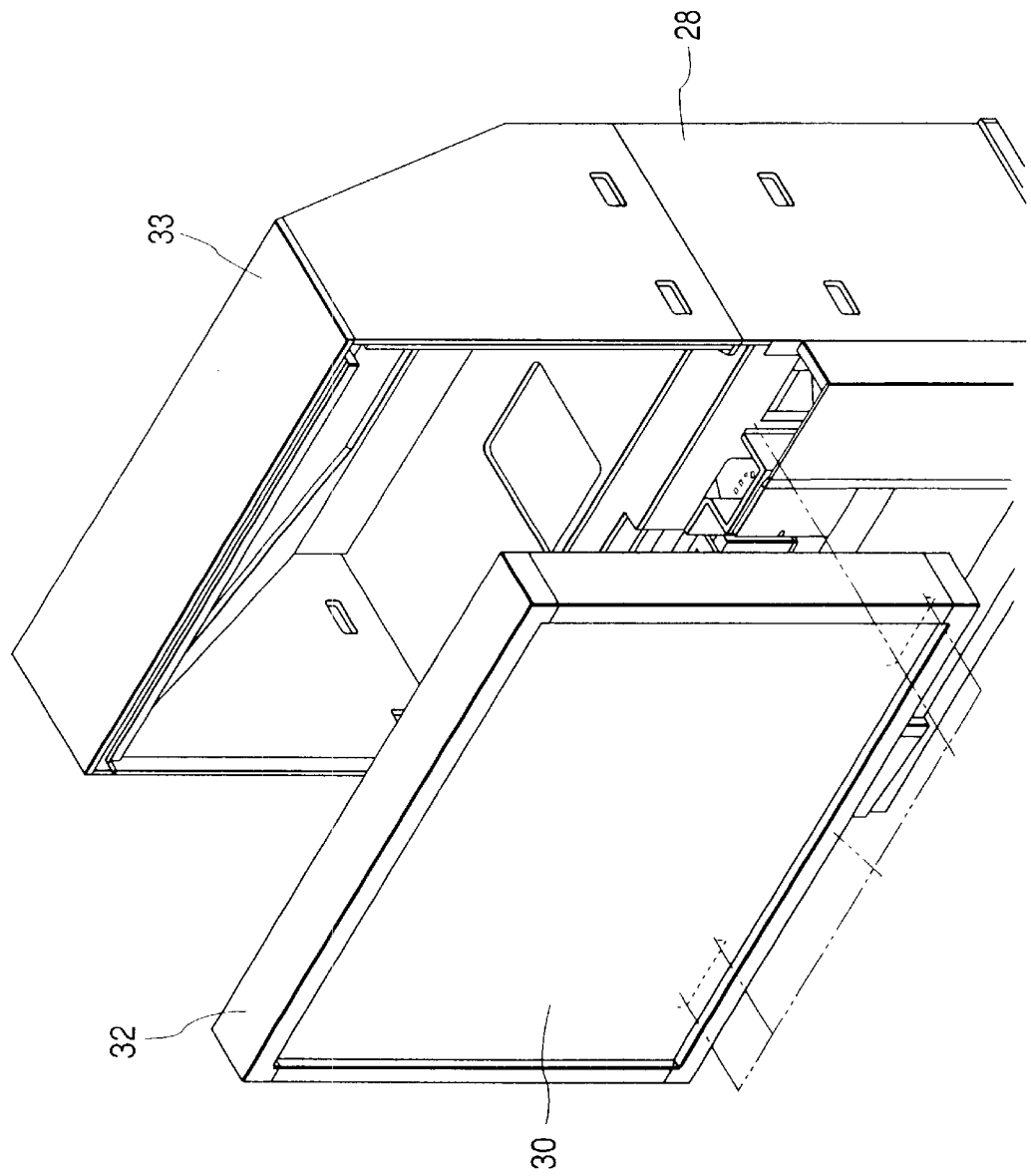
FIG. 6 is a drawing to show another configuration of the projector in the embodiment of the present invention.
Figure 7:
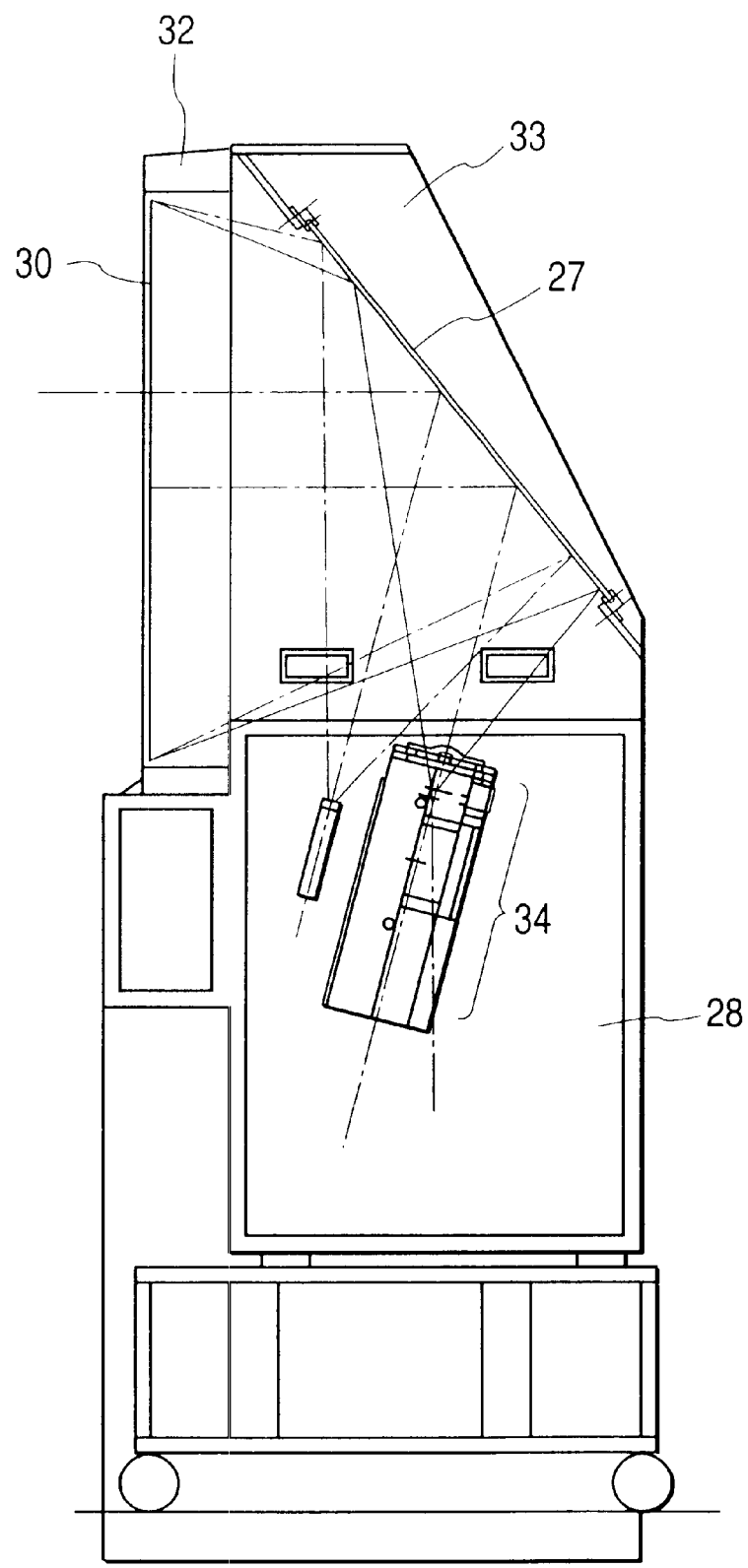
FIG. 7 is a drawing to show another configuration of the projector in the embodiment of the present invention.
Figure 8:
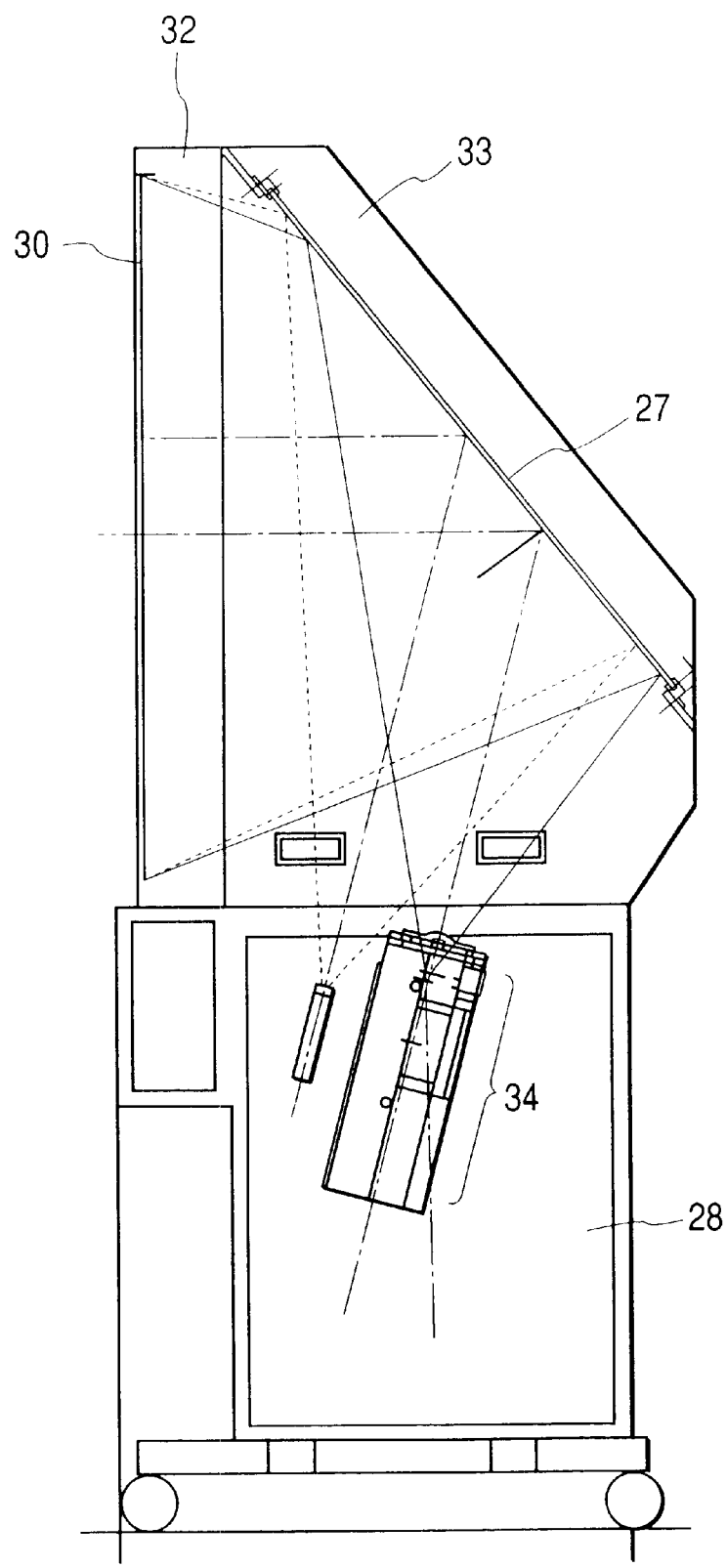
FIG. 8 is a drawing to show another configuration of the projector in the embodiment of the present invention.

Further, FIG. 6, FIG. 7, and FIG. 8 show another embodiment of the present invention. In these figures, the housing of the screen part 33 and the housing of the main body 28 are constructed so as to be separable from each other and the housing of the main body 28 including the adjustment unit 34 is adjusted to change the projection distance with variation in the screen size, as illustrated in FIG. 7 and FIG. 8. This permits common use of the housing of the main body 28 to different screen sizes.

Figure 11:
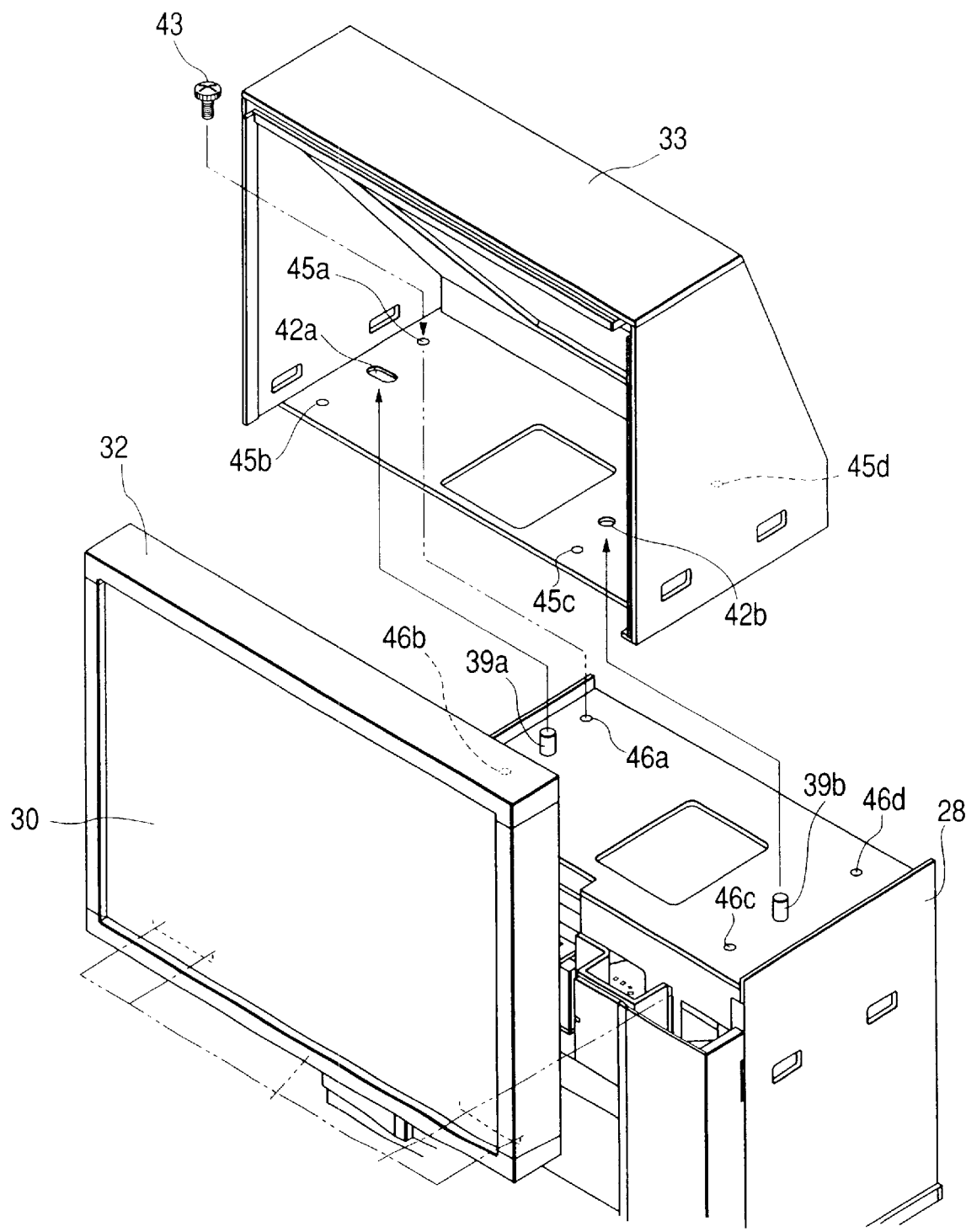
FIG. 11, FIG. 12, and FIG. 13 are perspective views to explain positioning of the upper and lower housing parts.
Figure 12:
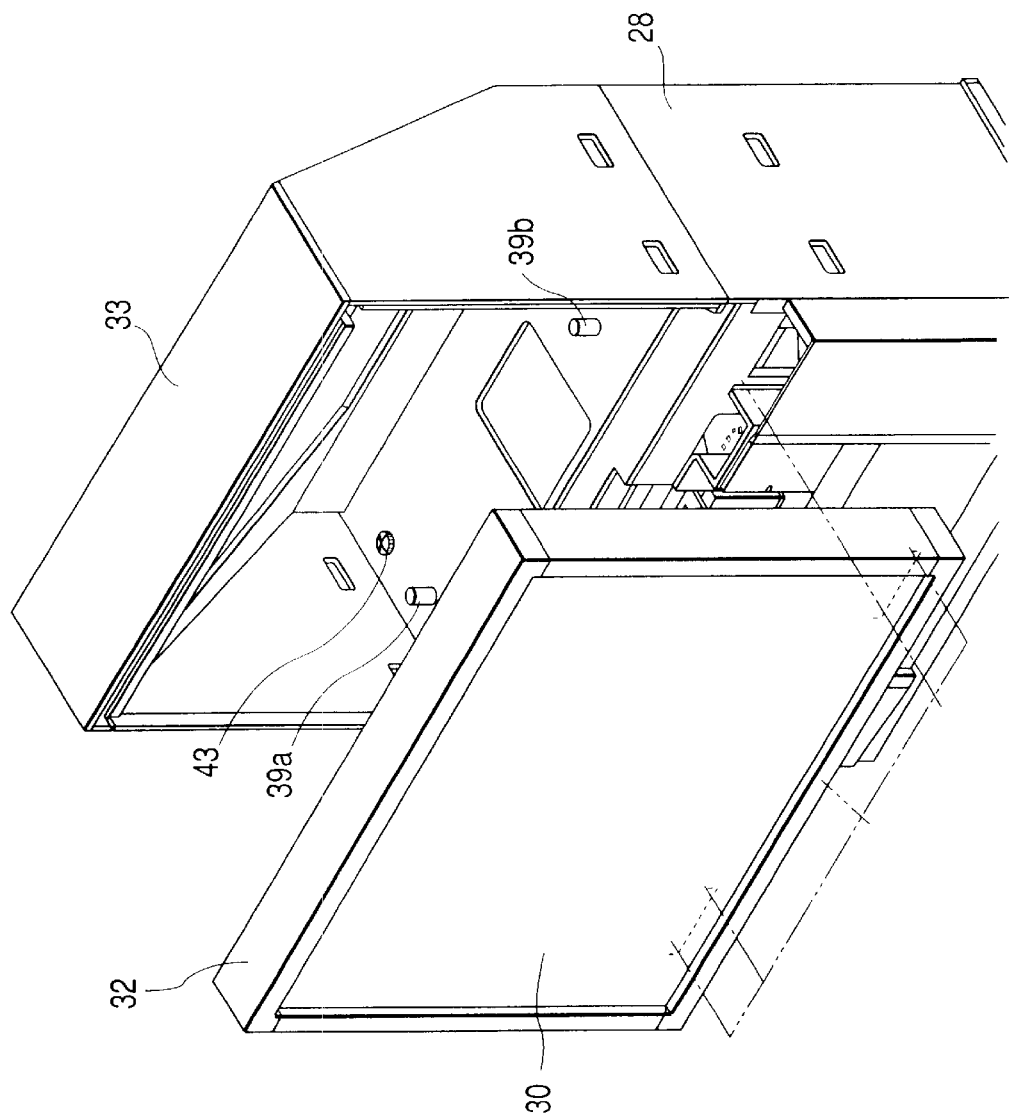
Figure 13:
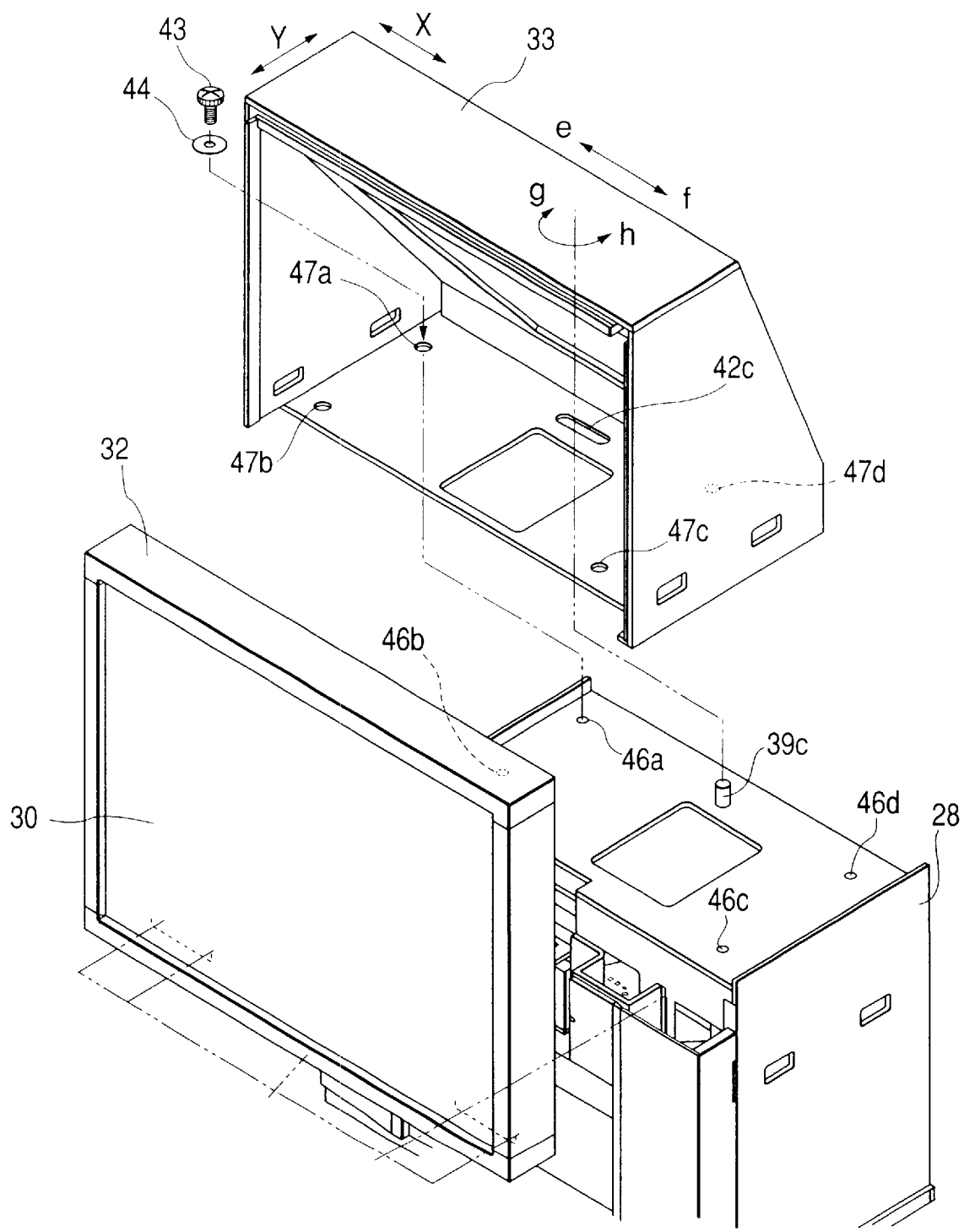
Figure 14:
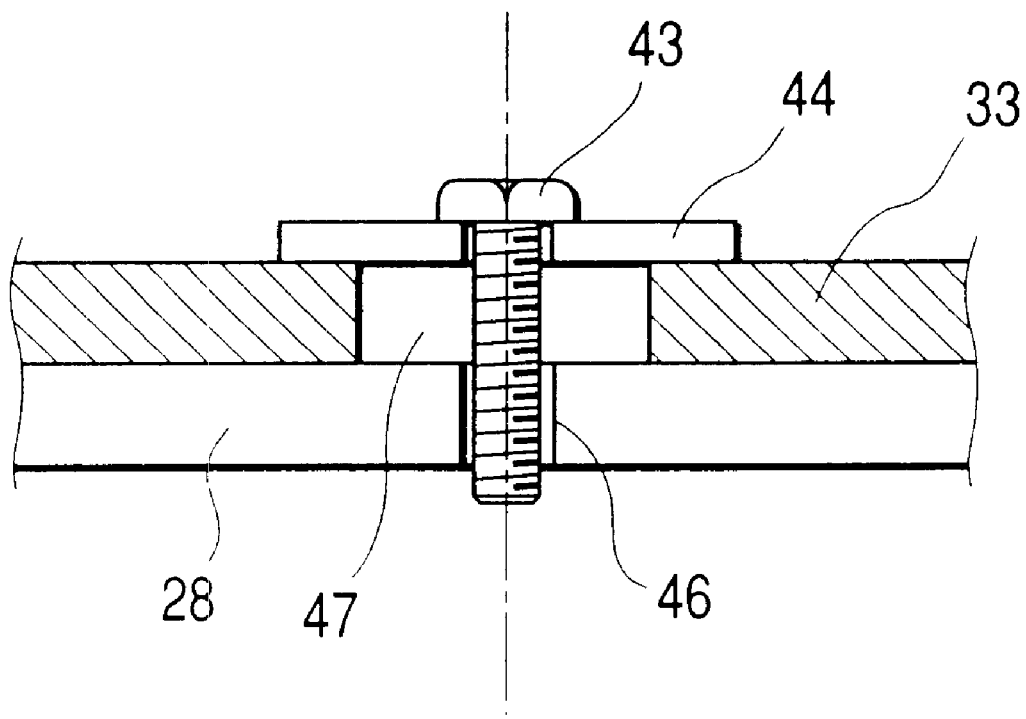
FIG. 14 is a cross-sectional view for detailing the connection between the upper and lower housing parts.

Next, positioning of the upper and lower housing parts will be described hereinafter with reference to the drawings. First, FIG. 11, FIG. 12, and FIG. 13 are perspective views to explain the positioning of the upper and lower housing parts, FIG. 14 is a cross-sectional view for detailing the connection between the upper and lower housing parts, and FIG. 15, FIG. 16, FIG. 17, and FIG. 18 show images displayed before the position of the display area is adjusted relative to the screen.

In the drawings, numeral 38 designates the display area; 39a, 39b, and 39c positioning pins, 42a and 42c positioning holes; 43 screws for connecting the upper and lower housing parts to each other; 44 washers; 45a, 45b, 45c, and 45d holes for connection between the upper and lower housing parts; 46a, 46b, 46c, and 46d pits for connection and fixation between the upper and lower housing parts; and 47a, 47b, 47c, and 47d holes for connection between the upper and lower housing parts.

The first embodiment of positioning between the upper and lower housing parts will first be described with reference to FIG. 11. In FIG. 11, the positioning holes 42a, 42b are bored in the upper part 33 and the upper and lower housing parts are set so that the positioning pins 39a, 39b disposed on the lower part 28 are fitted in the positioning holes 42a, 42b. Then the upper part 33 and the lower part 28 are set in the positioned state relative to each other as illustrated in FIG. 12. For connection between the upper and lower parts, the connecting screws 43 are put into the respective connection holes 45a, 45b, 45c, and 45d illustrated in FIG. 11, and are fixed in the fixing pits 46a, 46b, 46c, and 46d formed in the lower part 28, thereby connecting and fixing the upper and lower parts 33 and 28 as illustrated in FIG. 12. Next, the second embodiment of positioning between the upper and lower parts will be described with reference to FIG. 13. In FIG. 13, a slot for positioning 42c is bored in the upper part 33. The slot is formed such that the positioning pin 39c provided on the lower part 28 is so fitted into the slot 42c as to allow adjustment of the upper part 33 relative to the lower part 28 in the X-direction of e or f, or in the rotational direction of g or h. However, the upper and lower parts need to be fixed relative to each other in the Y-direction, because change of projection distance results in change of the size of the display area 38.

Figure 15:
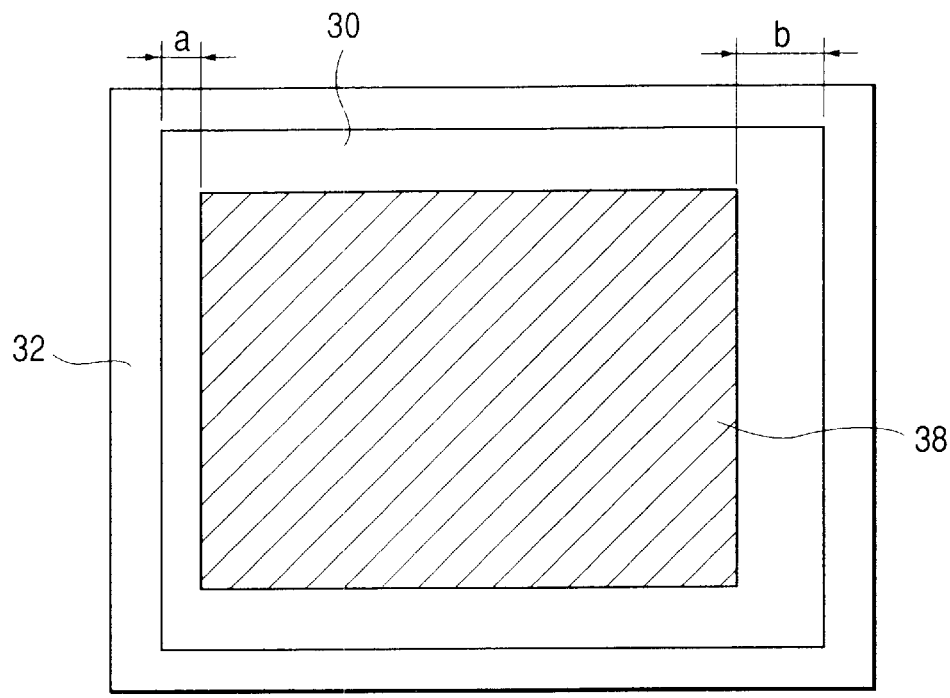
FIG. 15, FIG. 16, FIG. 17, and FIG. 18 are front views of the image display area, observed at the position ahead of the screen, before positional adjustment thereof relative to the screen.
Figure 16:
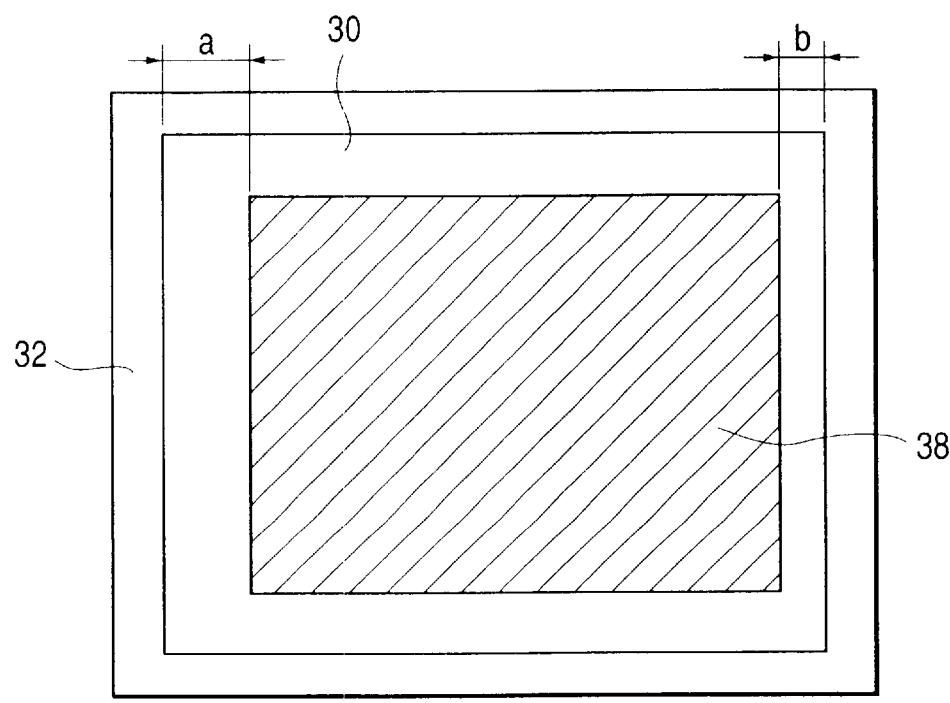

Adjustment methods will be described hereinafter. First, the image area is displayed on the screen in the structure of FIG. 13. When the display area 38 has no trapezoidal distortion and when a<b as illustrated in FIG. 15, the upper part 33 is moved in the direction f to meet the condition of a=b. When the display area 38 has no trapezoidal distortion and when a>b as illustrated in FIG. 16, the upper part 33 is moved in the direction e to meet the condition of a=b.

Figure 17:
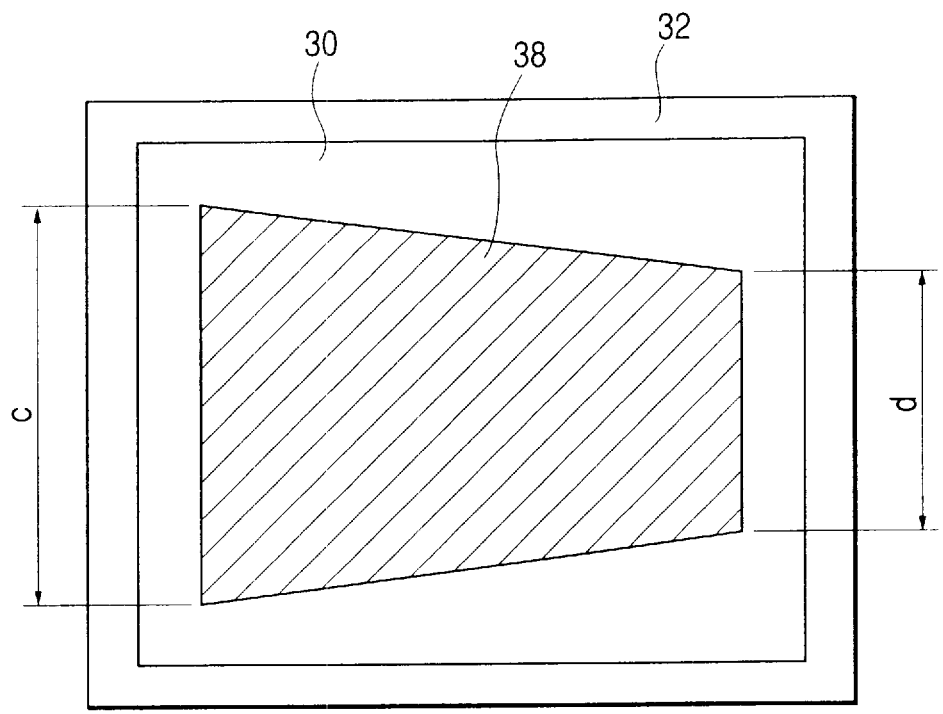
Figure 18:
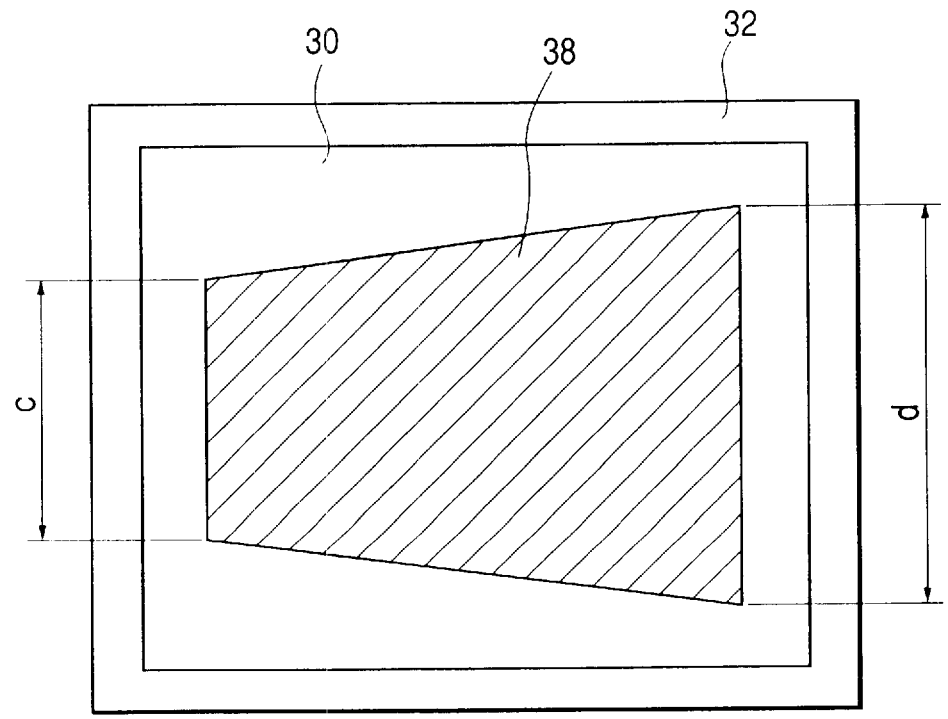

When the display area 38 has the trapezoidal distortion of c>d as illustrated in FIG. 17, the upper part 33 is rotated in the direction h to effect correction for the trapezoidal distortion. At this time, correction is made for the trapezoidal distortion, but the correction can change the balance between a and b. Therefore, adjustment is also made in the X-direction to make a=b. When the display area 38 has the trapezoidal distortion of c<d as illustrated in FIG. 18, the upper part 33 is rotated in the direction g to effect correction for the trapezoidal distortion. At this time, correction is made for the trapezoidal distortion, but the correction can change the balance between a and b. Therefore, adjustment is also made in the X-direction to make a=b. Next described is the connection between the upper and lower parts carried out after completion of the correction of the display area 38. Since the upper part 33 is not always fixed at a constant position relative to the lower part 28, the holes 47 are bored in the size larger than the holes 45, as illustrated in FIG. 14. This is a means for avoiding such hindrance that the upper and lower parts cannot be incorporated with each other in the connection work of the upper and lower parts with the connection screws 43 before the relative positions of the upper and lower parts are determined, e.g., in the state of FIG. 11. The washers 44 serve as functional assistance for the larger connection holes 47.

What is claimed is:

1. A projector of a rear projection type for projecting an image from behind a screen, said projector comprising:
    an upper part including a screen of a predetermined size; and
    a lower part including projection means for projecting an image onto the screen and detection means for detecting information on the screen,
        wherein an optical axis of said projection means and an optical axis of said detection means are kept in parallel,
        wherein said upper part is replaceable with an another upper part having a screen of another size different from said screen of the predetermined size.

2. The projector according to claim 1, wherein a projection distance of said projection means is variable.

3. The projector according to claim 1, wherein said upper part comprises a reflecting mirror behind said screen and wherein said projection means projects the image via the reflecting mirror onto said screen to display the image thereon.

4. The projector according to claim 1, wherein said information is a position indicated on said screen.

5. The projector according to claim 1, wherein said projection means and said detection means are integrally formed.

6. The projector according to claim 5, wherein at least part of said projection means and said detection means is moved to effect positional adjustment of a projection range in which said projection means projects the image and a detection range in which said detection means can detect the information, on said screen.

7. The projector according to claim 5, wherein said projection means and said detection means are integrally formed so that an optical axis of a projection optical system of said projection means is parallel to an optical axis of a detection optical system of said detection means.

8. The projector according to claim 1, which comprises image control means for detecting the information indicated on said screen, by use of said detection means and changing the image displayed on said screen, based on the information.

9. The projector of claim 1 wherein relative distance between said projection means and detection means is kept in constant.

10. The projector of claim 1 wherein said projection means includes image forming means for forming the image.

11. The projector of claim 10 wherein said image forming means further includes a liquid crystal display.

12. A projector of a rear projection type for projecting an image from behind a screen, said projector comprising:
    an upper part including a screen of a predetermined size; and
    a lower part including projection means for projecting an image onto the screen and detection means for detecting information indicated on the screen from the front side of the screen, said projection means including image forming means for forming the image,
        wherein said projection means and said detection means are integrally formed to maintain an optical axis of said projection means and an optical axis of said detection means in parallel.

13. The projector according to claim 12, wherein said projection means and said detection means are integrally formed so that an optical axis of a projection optical system of said projection means is parallel to an optical axis of a detection optical system of said detection means.

14. The projector according to claim 12, which comprises image control means for changing the image displayed on the screen, based on the information detected by use of said detection means.

15. The projector according to claim 12, wherein a projection distance of said projection means is variable.

16. The projector according to claim 12, wherein said upper part comprises a reflecting mirror behind said screen and wherein said projection means projects the image via the reflecting mirror onto said screen to display the image thereon.

17. The projector according to claim 12, wherein said image forming means includes a liquid crystal display.

18. The projector of claim 12 wherein relative distance between said projection means and detection means is kept in constant.

19. A projector of a rear projection type for projecting an image from behind a screen, said projector comprising:
   an upper part including a screen of a predetermined size and a reflecting mirror for guiding an image to be projected onto the screen;
   a lower part to which said upper part is mounted, said lower part including projection means for projecting the image onto the screen and detection means for detecting information on the screen; and
   positioning and fixing means for performing positioning and fixation between said upper part and said lower part, said positioning and fixing means enabling said upper part to be movable in a direction along a horizontal direction of said screen and in a direction of rotation of said screen about a predetermined axis,
   wherein an optical axis of said projection means and an optical axis of said detection means are kept in parallel.

20. A projector of a rear projection type for projecting an image from behind a screen, said projector comprising:
   an upper part including a screen of a predetermined size; and
   a lower part including a projection device which projects an image onto the screen and a detection device which detects information on the screen,
   wherein an optical axis of said projection device and an optical axis of said detection device are kept in parallel,
   wherein said upper part is replaceable with an another upper part having a screen of another size different from said screen of the predetermined size.

21. A projector of a rear projection type for projecting an image from behind a screen, said projector comprising:
   an upper part including a screen of a predetermined size; and
   a lower part including a projection device which projects an image onto the screen and a detection device which detects information indicated on the screen from the front side of the screen, said projection device including an image forming device which forms the image,
   wherein said projection device and said detection device are integrally formed to maintain an optical axis of said projection device and an optical axis of said detection device in parallel.

22. A projector of a rear projection type for projecting an image from behind a screen, said projector comprising:
   an upper part including a screen of a predetermined size and a reflecting mirror for guiding an image to be projected onto the screen;
   a lower part to which said upper part is mounted, said lower part including a projection device which projects the image onto the screen and a detection device which detects information on the screen; and
   a positioning device and a fixing device which perform positioning and fixation, respectively, between said upper part and said lower part, said positioning and fixing devices enabling said upper part to be movable in a direction along a horizontal direction of said screen and in a direction of rotation of said screen about a predetermined axis,
   wherein an optical axis of said projection device and an optical axis of said detection device are kept in parallel.

* * * * *